United States Patent [19]

Tuma

[11] Patent Number: 4,471,418
[45] Date of Patent: Sep. 11, 1984

[54] SWITCHING POWER SUPPLY

[75] Inventor: Wade Tuma, Los Gatos, Calif.

[73] Assignee: Compower Corporation, San Jose, Calif.

[21] Appl. No.: 496,986

[22] Filed: May 25, 1983

Related U.S. Application Data

[63] Continuation of Ser. No. 293,397, Aug. 17, 1981, abandoned.

[51] Int. Cl.³ .................................................. H02M 3/335
[52] U.S. Cl. ........................................ 363/21; 363/97; 323/285; 323/288; 323/299
[58] Field of Search .................................. 363/18–21, 363/50, 55–56, 97, 131; 323/284, 285, 288, 299, 303; 38331/112

[56] References Cited

U.S. PATENT DOCUMENTS 3,911,352 10/1975 Slack .................................... 361/100
4,183,080 1/1980 Liebman ............................... 363/18
4,220,987 9/1980 Rao et al. ............................. 363/21

Primary Examiner—Peter S. Wong
Attorney, Agent, or Firm—Thomas E. Schatzel

[57] ABSTRACT

A switching power supply in which the maximum power output is limited during various line voltages within a predetermined range on a cycle by cycle basis. The power supply comprises a transformer in which an alternating current voltage is applied across the primary winding thereof. Switching means are connected in series with the primary winding. The repetitive conduction and non-conduction of the switching means controls the flow of current in the secondary winding circuit of the transformer for producing a direct current output voltage in the secondary winding circuit. Output voltage is produced in the secondary winding circuit during the interval the switching means is not conducting. For limiting the maximum power output in the secondary winding circuit during various line voltages, a control circuit controls the maximum conduction time of the switching means in response to the rectified voltage appearing across the primary winding of the transformer. The conduction time of the switching means under the control of the control circuit is commensurate with the time it takes the current flowing through the primary winding of the transformer to reach a predetermined magnitude and is commensurate with the magnitude of the voltage across the primary winding of the transformer varying from a preselected magnitude. Thus, the output power produced in the secondary winding circuit has a predetermined maximum value although there is a variance from the preselected limits for the line voltage.

8 Claims, 2 Drawing Figures

SWITCHING POWER SUPPLY

This application is a continuation, of application Ser. No. 293,397, filed 8/17/81, now abandoned.

BACKGROUND OF THE INVENTION

The present invention relates in general to power supplies, and more particularly to a switching power supply.

Rectified and filtered alternating current line voltage has been converted to a direct current output voltage through the repetitious opening and closing of a switch in series with the primary winding of a transformer. When the switch was closed, the current flow in the primary winding of the transformer increased and energy was stored in the core of the transformer. During this interval of time, a rectifier in the secondary winding circuit of the transformer was reversed biased and nonconducting. When the switch was opened, the action of the inductance of the primary winding caused the voltage across the primary winding to increase in magnitude above the rectified and filtered line voltage. Thereupon, the rectifier in the secondary winding circuit conducted to provide a direct current output voltage. The direct current output voltage was a function of the energy stored in the core of the line transformer.

With the advent of computers, it became important to provide a power supply that maintained a relatively constant maximum power output at various line voltages. It has been known that line voltages and line frequencies may vary from country to country. Yet, the power requirements for the storage of data in memories must remain within fixed limits. The need for a constant power output was apparent. Under fault conditions, additional power over the rated power may result in damage to the wiring of computers. Failure of the power supply to properly handle power in excess of the rated power may cause the power supply to fail.

In typical flyback power supplies, the power supply was protected against overloading by limiting the peak current to a known value. This arrangement has not been satisfactory. While the load current remained constant, the rectified and filtered a.c. line voltage varied. Increases in the line voltage resulted in the increases in the power output. Such systems were not economical to manufacture.

SUMMARY OF THE INVENTION

A switching power supply in which switching means control the flow of current in the primary winding of a transformer to produce in a secondary winding circuit of the transformer direct current voltage of pulse widths controlled by the switching means. A control circuit controls the operation of the switching means in response to the voltage across the primary winding. The pulse width of the direct current voltage produced in the secondary winding circuit of the transformer is inversely related to the magnitude of the voltage across the primary winding of the transformer when there is a variance from the preselected limits for the line voltage.

A switching power supply for limiting maximum power output during various line voltages within a predetermined range on a cycle by cycle basis in which switching means control the flow of current in the primary winding of a transformer to produce in a secondary winding circuit of the transformer direct current voltage controlled by the switching means. A control circuit controls the operation of the switching means in response to the current flow through the primary winding reaching a predetermined magnitude and in response to variations of voltage across the primary winding of the transformer from a predetermined magnitude.

By virtue of the present invention the power output of the switching power supply is limited to a maximum value over a range of various line voltages.

A feature of the present invention is the maximum power output for the switching power supply is on a cycle by cycle basis rather than an average power basis. Thus, the components of the power supply are never subjected to an excessive power output during any conversion cycle. The power supply does not on any occasion produce more than the maximum rated output whether the operating condition is normal or under fault or during transient intervals.

Another feature of the present invention is that the power supply circuit requires less open loop gain around its switching control circuit. Thus, improved output voltage regulation is attainable without instability and slow response time caused by high loop gain.

Another feature of the present invention is the low power consumption.

Still another feature of the present invention is the ability to have a stable operation over a relatively wide temperature range.

DESCRIPTION OF THE PREFERRED EMBODIMENT

Figure 1:
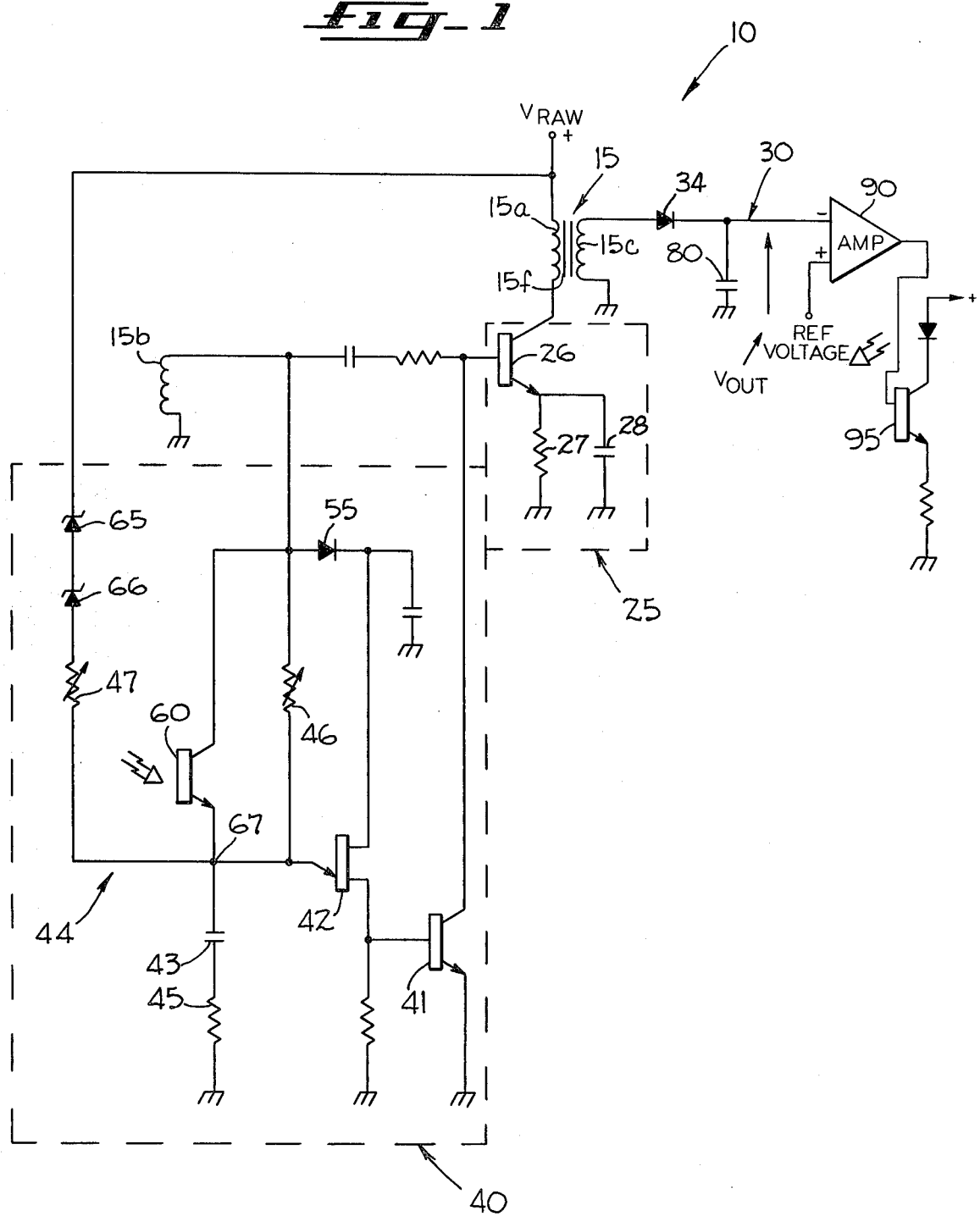
FIG. 1 is a simplified schematic diagram of a switching power supply embodying the present invention.
Figure 2:
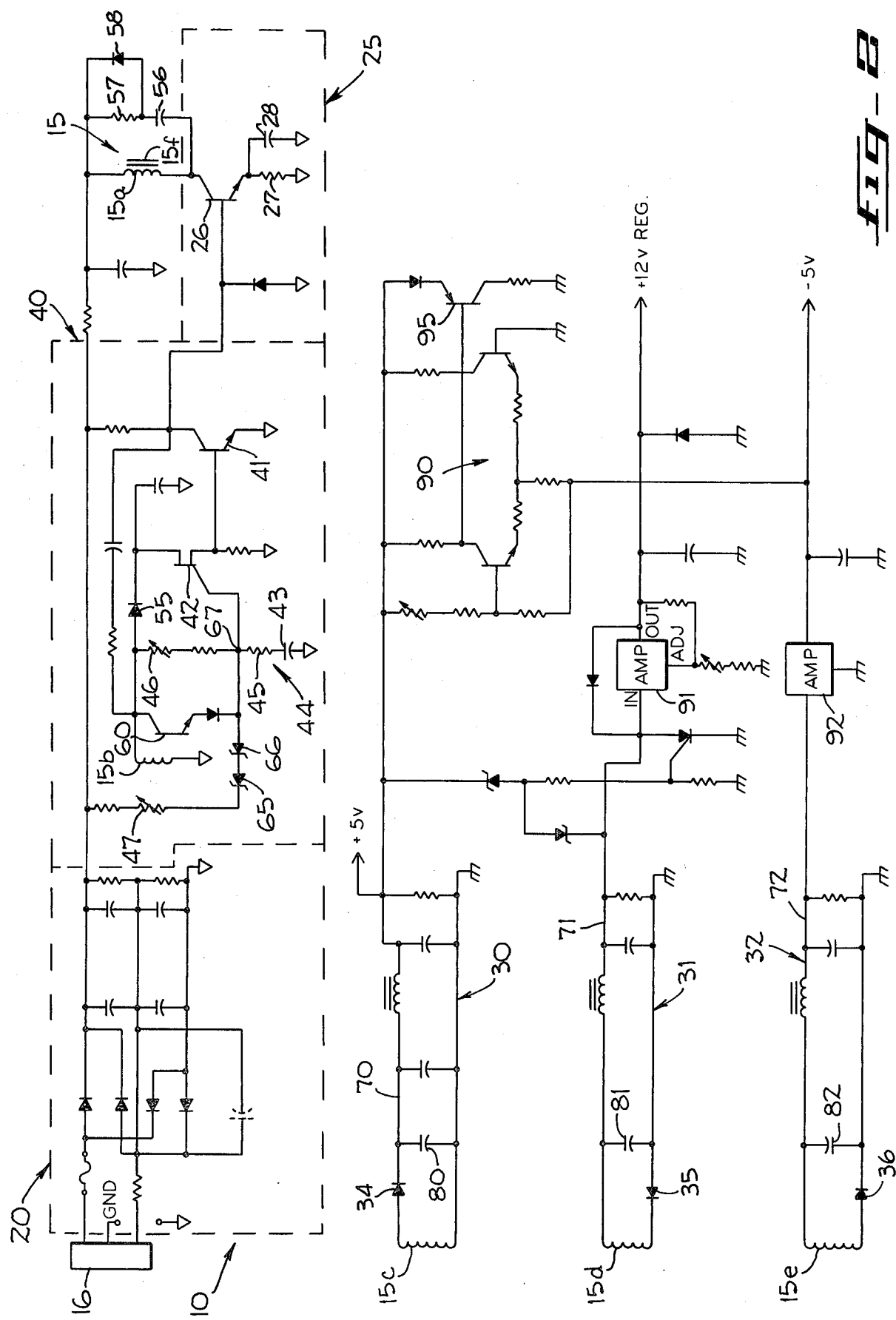
FIG. 2 is a detailed schematic diagram of the switching power supply shown in FIG. 1.

Illustrated in FIGS. 1 and 2 is a switching power supply 10 embodying the present invention in which the maximum power output is limited during various line voltages within a predetermined range on a cycle by cycle basis. The power supply 10 comprises a suitable transformer 15. As shown in the drawings, the transformer 15 includes a primary winding 15a, secondary windings 15b–15e and a core 15f.

Voltage is applied across the primary winding 15a of the transformer 15. In the preferred embodiment, the voltage is a rectified and filtered alternating current voltage (Vraw). For applying a rectified and filtered alternating current voltage across the primary winding 15a, alternating current line voltage is applied to a terminal board 16 (FIG. 2). Connected to the terminal board 16 and the primary winding 15a of the transformer 15 is a conventional and suitable rectifying and filtering circuit 20 (FIG. 2).

Switching means 25 (FIGS. 1 and 2) control the time interval of the flow of current through the primary winding 15a of the transformer 15. In the exemplary embodiment, the switching means 25 include a switching transistor 26 that has its collector electrode connected in series with the primary winding 15a. When the switching transistor 26 conducts, current flow in the primary winding 15a increases and energy is stored in the core 15f of the line transformer 15. During the interval of time in which the switching transistor 26 conducts, no output voltage is produced in the secondary windings 15b–15e of the transformer 15. The switching means 25 further includes a resistor 27 and a capacitor 28. The secondary windings 15c–15e are included respectively in secondary winding circuits 30-32. Suitable rectifiers 34-36 are respectively included in the secondary winding circuits 30-32. An output circuit for each of the secondary winding circuits includes that section of the secondary winding circuit connected to its associated secondary winding.

During the time interval that the switching transistor 26 conducts, the rectifiers 34-36 are respectively reversed biased and non-conducting. When the switching transistor 26 is not conducting, the voltage across the primary winding 15a rises above the rectified and filtered alternating current voltage across the primary winding 15a. As a consequence thereof, the rectifiers 34-36 conduct and a d.c. output pulse is produced in the secondary winding circuits 30-32, respectively. Thus, a direct current output voltage is produced in the secondary winding circuits 30-32 through the conduction and non-conduction of the switching transistor 26 during each conversion cycle for transferring all the energy stored in the core 15f. The width of the pulse of the direct current output voltage is directly related to the time interval during which the switching transistor 26 does not conduct. Capacitor 28 charges when switching transistor 26 conducts and discharges through resistor 27 when switching transistor 26 does not conduct for reverse biasing switching transistor 26.

Thus, during each conversion cycle, the switching transistor 26 is conductive and non-conductive. Additionally, the direct current output voltage in each of the secondary winding circuits 30-32 is a function of the energy stored in the primary winding 15a of the transformer 15. More specifically, the energy stored in the transformer 15 is a function of the voltage across the primary winding 15a, and the relationship between the inductance of the primary winding 15a, the current flow through the primary winding 15a, and the interval of time during which current flows in the primary winding 15a.

The switching transistor 26 is turned on during each conversion cycle automatically from the regenerative effects of the secondary winding 15b of the transformer 15. The voltage across the secondary winding 15b when the switching transistor 26 conducts is $$\frac{Vraw \cdot N15b}{N15a},$$

wherein Vraw is the rectified and filtered alternating current voltage applied across the primary winding 15; N15b is the number of turns for the secondary winding 15b; and N15a is the number of turns for the primary winding 15a. Thus, the voltage across the secondary winding 15b is a small percentage of the voltage Vraw and varies directly therewith.

A control circuit 40 (FIGS. 1 and 2) causes the switching transistor 26 to stop conducting during each conversion cycle when the current flow in the primary winding 15a has reached the correct magnitude to maintain the output voltage in the secondary windings 15c-15e at the proper magnitude or level. To control the maximum power output in the secondary winding circuits 30-32 during various line voltages, the control circuit 40 controls the conduction time of the switching means 25 in response to the current flowing through the primary winding 15a and in response to the voltage (Vraw) applied across the primary winding 15a. Thus, the lower the voltage (Vraw) the greater the time interval for the current flowing through the primary winding 15a to reach a predetermined value; the greater the conduction of the switching transistor 26; and the greater the width of the direct current output voltage in the secondary winding circuits 30-32. The greater the voltage (Vraw) across the primary winding 15a at variance with a prescribed value, the lesser the conduction time of the switching transistor 26, thereby allowing a predetermined magnitude for the maximum power output.

Toward this end, the control circuit 40 comprises a control transistor 41. The collector electrode of the control transistor 41 is connected to the base electrode of the switching transistor 26. When the control transistor 41 is caused to conduct, the switching transistor 26 will become non-conductive. The switching transistor 26 is caused to conduct automatically during each conversion cycle in a manner heretofore described by the regenerative effects of the secondary winding 15b. When the control transistor 26 is so caused to conduct, the switching transistor 41 will become non-conductive and is reset to its initial non-conductive state.

A unijunction transistor 42 of the control circuit includes a first base electrode which is connected to the base electrode of the control transistor 41. When a voltage applied to an emitter electrode of the unijunction transistor 42 equals the threshold voltage for the unijunction transistor 42, the control transistor 41 will conduct and will remain conductive until reset by the switching transistor 26. The unijunction transistor 42 remains conductive until the voltage applied to the emitter electrode thereof is less than the threshold voltage.

Voltage is applied to the emitter electrode of the unijunction transistor 42 from the charge stored in a timing capacitor 43 of an R-C time network 44 in the control circuit 40. When the voltage applied to the emitter electrode of the unijunction transistor 42 equals the threshold voltage for the unijunction transistor 42, the unijunction transistor 42 conducts. In so doing, the charge stored in the timing capacitor 43 is discharged and applied via the unijunction transistor 42 to the base electrode of the control transistor 41 to cause the conduction thereof.

The R-C time network 44 comprises the timing capacitor 43, a resistor 45, a variable resistor 46, and a variable resistor 47. By adjusting the resistance of the variable resistors 46 and 47, the time constant for charging the timing capacitor 43 is regulated. By regulating the time constant for charging the timing capacitor 43, the time interval in which the control transistor 41 does not conduct is controlled by controlling the time at which the threshold voltage of the unijunction transistor 42 is reached and by controlling, therefore, the conduction of the control transistor 41. The variable resistor 46 is set at the magnitude for the lowest voltage operating point and the variable resistor 47 is set at the magnitude for the highest voltage operating point. A diode 55 compensates for the temperature drift of the unijunction transistor 42. Thus, the variable resistor 46 and 47 are adjusted to limit the maximum power output for the power supply 10 over a range of variable voltages in the manner above described and the diode 55 serves to maintain stability over a wide range of operating temperatures. A regenerating capacitor 56 is in series with a parallel combination of a discharge resistor 57 and a bypass diode 58 while the regenerating capacitor 56 and the discharge resistor 57 are in parallel with the primary winding 15a as is shown in FIG. 2. Regenerating capacitor 56 stores a charge during the conduction time mode and after the field of energy stored in the core is totally transferred to the secondary windings circuits 30-32 during the nonconduction time mode, regenerating capacitor 56 discharges through primary winding 15a providing an open circuit primary winding voltage that rises above the applied rectified and filtered alternating current voltage. The result is an alternating current voltage induced into secondary winding 15b providing a secondary current flow that forward biases the switching transistor 26 and reinitiates the conduction time mode.

An optical coupler transistor 60 of the control circuit 40 conducts at a rate inversely related to the flow of current through the switching transistor 26. The emitter electrode of the optical coupler transistor 60 is connected to the timing capacitor 43. Under a no load condition for the switching transistor 26, the optical coupler transistor 60 conducts at a high magnitude of current to rapidly charge the timing capacitor 43 to the threshold voltage of the unijunction transistor 42. Thereupon, the unijunction transistor 42 conducts and the charge stored in the timing capacitor 43 is discharged and applied to the control transistor 41 via the unijunction transistor 42. This action causes the switching transistor 26 not to conduct.

As the load applied to the power supply 10 is increased, the optical coupling transistor 60 conducts less current. Consequently, the time interval for the timing capacitor 43 to charge for reaching the threshold voltage of the unijunction transistor 42 is longer. As a result thereof, the control transistor 41 conducts for a lesser time interval during a conversion cycle and the switching transistor 26 conducts for a longer time interval during a conversion cycle. At full load for the switching transistor 26 or at the prescribed value for the current flow through the primary winding 15a, the optical coupling transistor 60 does not conduct. The current for charging the timing capacitor 43 flows through the variable resistor 46. Thus, the resistor 46 and the capacitor 43 form an RC network to set a prescribed time interval for the switching transistor 26 to conduct at full load or at the predetermined magnitude for the current flow through the primary winding 15a.

Zener diodes 65 and 66 serve to compensate for variations in voltages (Vraw) of the magnitude greater than a predetermined magnitude, thus causing less error signal at the feedback summing junction 67. This arrangement allows for improved voltage regulation without having a high loop gain around the control circuit 40. A high loop gain results in instability and slow response time. The Zener diodes 65 and 66 interconnect the primary winding 15a of the transformer 15 with the feedback summing junction 67. The current flow through the Zener diodes 65 and 66 is directly related to the magnitude of the voltage (Vraw) across the primary winding 15a of the transformer 15 when the voltage (Vraw) exceeds a preselected magnitude. The greater the voltage (Vraw) across the primary winding 15a of the transformer 15 in excess of the predetermined voltage (Vraw), the greater the current flow through the Zener diodes 65 and 66. The greater the current flow through the Zener diodes 65 and 66, the lesser the time interval to charge the timing capacitor 43 to the threshold voltage of the unijunction transistor 42. Hence, the control transistor 41 remains conductive for a greater time interval commensurate with the amount that the voltage (Vraw) exceeds a predetermined magnitude during a conversion cycle and the switching transistor 26 conducts for a lesser time interval during a conversion cycle commensurate with the amount that the line voltage (Vraw) exceeds a predetermined magnitude. Therefore, magnitude of the current pulse in the primary winding 15a is kept constant during a conversion cycle, when the line voltage (Vraw) exceeds a predetermined magnitude.

The voltage drop across the Zener diode 65 and 66 is selected to be equal to the magnitude of the voltage (Vraw) at the lowest line voltage at which full power is desired. When the voltage drop across the Zener diodes 65 and 66 equal the voltage (Vraw), no current will flow through the variable resistor 47 and the maximum d.c. pulse width is produced in the primary winding 15. As the voltage (Vraw) increases, current flow through the variable resistor 47 charges the timing capacitor 43 at a faster rate. This results in reducing the time in which the switching transistor 26 conducts. The variable resistor 47 is adjusted at the highest line voltage at which the full power is intended.

From the foregoing, it is to be observed that the summing or timing capacitor 43 serves as a reservoir for the charge to turn-off the switching transistor 26. The summing circuit includes the capacitor 43 and the resistor 45. This action minimizes quiescent loss while providing a very rapid high current pulse to be applied to the base electrode of the control transistor 41.

The secondary winding circuits 30-32 include respectively suitable and conventional filter circuits 70-72 (FIG. 2). The rectified direct current output voltages appear across load capacitors 80-82, respectively, of the secondary winding circuits 30-32 and are applied to the filter circuits 70-72. Connected to the output of the filter circuits 70-72 are suitable amplifiers 90-92. In the secondary winding circuit 31, the amplifier 91 is adjustable to regulate the output thereof. In the exemplary embodiment, the regulated output is 12 volts. A −5 volt output is produced by the amplifier 92 of the secondary winding circuit 92. The amplifier 90 of the secondary winding circuit 30 has a reference voltage applied to the input side thereof from the secondary winding circuit 92, and the output of the amplifier 30 is measured via an optical coupling transistor 95 for an error signal.

I claim:

1. A switching power supply for controlling the maximum output power comprising, in combination:
   a transformer having a primary winding, a plurality of secondary windings and a core, a rectified and filtered alternating current voltage means for providing a rectified and filtered alternating current voltage applied to said primary winding for causing current to flow through said primary winding and creating a field of energy to be stored in said core;
   switching means connected to said primary winding and a first of said plurality of secondary windings for providing a path with said primary winding through which said primary current flows and for interrupting said path with said primary winding to cause magnetic induction across at least a second of said plurality of secondary windings for providing a secondary current to flow in said second of said plurality of secondary windings to permit a transfer of said field of energy stored in said core;
   input signal means for applying an input signal to the switching means during a conducting state and a nonconducting state wherein said conducting state comprises a conduction-time mode of the switching means during an interval of time during which the switching means conducts said primary current for storing said field of energy in said core and said nonconducting state comprises a nonconduction time mode of the switching means during an interval of time during which the switching means blocks said primary current for transferring said field of energy with the maximum output power of the switching power supply being controlled by said conduction-time mode of the switching means and said conduction-time mode being controlled by the magnitude of the rectified and filtered alternating current voltage applied across said primary winding and wherein the summation of said conduction time mode and nonconduction time mode being equivalent to a conversion cycle and wherein said nonconduction time mode existing only for a time required to exhaust said field of energy stored in said core, the frequency of said conversion cycle being uncontrolled;

an output circuit including a rectifier connected to said second of said plurality of secondary windings for providing a direct current output voltage and said secondary current during said nonconduction-time mode of the switching means when said direct current output voltage biases said rectifier to conduct permitting said transfer of all of said field of energy stored in said core to said output circuit prior to the nonconduction of said rectifier accompanied by the return of said conduction-time mode of the switching means for reducing power losses in said rectifier; and control circuit means connected to receive the rectified and filtered alternating current voltage applied across said primary winding and the switching means for exclusively activating said nonconduction-time mode and including a control circuit resistive-capacitive network comprised of a timing capacitor and a plurality of variable resistors, said timing capacitor connected to electrical ground through a fixed resistor and having a charge stored at a rate directly related to the magnitude of said rectified and filtered alternating current voltage applied across said primary winding, said plurality of variable resistors including two variable resistors electrically connected to said timing capacitor for regulating the time constant for storing said charge on said timing capacitor for limiting the duration of said conduction-time mode of the switching means within a range of line voltage operating points at which full power is desired to be constant and independent of the magnitude of the rectified and filtered alternating current voltage applied across said primary winding, a first of said plurality of variable resistors being set at a magnitude for providing a lowest line voltage operating point and a second set of said plurality of variable resistors being set at a magnitude for providing a highest line voltage operating point, said plurality of variable resistors being adjusted to regulate the maximum power output of the switching power supply over said range of line voltage operating points, and wherein the control circuit means is further connected to and cooperates with a measuring means for measuring said rectified and filtered alternating current voltage applied across said primary winding wherein said rectified and filtered alternating current voltage being smaller when compared with a prescribed voltage value provides a longer time interval for said current flowing through said primary winding to reach a predetermined current value for providing a longer time period for said conduction time mode of the switching means and a wider pulse of said direct current output voltage in the output circuit and wherein said rectified and filtered alternating current voltage being larger when compared with said prescribed voltage value provides a shorter time interval for said current flowing through said primary winding to reach said predetermined current value for providing a shorter period for said conduction time mode of the switching means and a narrower pulse of said direct current output voltage in the output circuit, said measuring means facilitating the control of the duration of said conduction-time mode of the switching means and said range of line voltage operating points by the control circuit means, and wherein said secondary current through said rectifier is a zero value prior to said nonconduction of said rectifier after said transfer of all of said field of energy stored in said core and wherein said primary current has a zero value at the initiation of said conduction-time mode for providing voltage regulation limiting the maximum output power to a capacity electrical load.

2. The switching power supply of claim 1 wherein the first of said plurality of secondary windings is wound about the transformer core and electrically connected to the switching means, the switching means including a switching transistor for controlling said current flow through said primary winding, the first of said plurality of secondary windings having a first end electrically connected to a base electrode of said switching transistor and a second end connected to electrical ground, and the switching power supply further includes a regenerating capacitor connected in series with a resistor, said regenerating capacitor and said resistor being connected in a parallel configuration with the primary winding, said regenerating capacitor storing an electrical charge during said conduction time mode and discharging through the primary winding said electrical charge after said transfer of all of said field of energy stored in said core during said nonconduction time mode providing an open circuit voltage across said primary winding greater in magnitude than the magnitude of said rectified and filtered alternating current voltage and wherein a positive half cycle of an alternating current voltage is induced into said first of said plurality of secondary windings for each of a plurality of said conversion cycles, said alternating current voltage being proportional to and dependent upon the magnitude of the rectified and filtered alternating current voltage applied across said primary winding and the number of turns in the first of said plurality of secondary windings and being inversely proportional to the number of turns in said primary winding with said alternating current voltage being a small percentage of and varying directly with the rectified and filtered alternating current voltage applied across the primary winding for exclusively cycling the switching means from said nonconduction-time mode to said conduction-time mode by applying said alternating current voltage to said base electrode of said switching transistor for causing said switching transistor to conduct and for causing the control circuit means to be reset to an initial nonconductive state.

3. The switching power supply of claim 2 wherein the switching means further includes a switching means resistive-capacitive network comprised of a resistor and a capacitor arranged in a parallel configuration and connected to an emitter electrode of said switching transistor for reverse biasing and switching transistor during said nonconduction mode.

4. The switching power supply of claim 3 wherein said charge stored on said timing capacitor of said control circuit resistive-capacitive network provides a first voltage applied to an emitter electrode of a unijunction transistor wherein said first voltage upon reaching a threshold biasing voltage of said unijunction transistor provides conduction of said unijunction transistor;

a control transistor including a base electrode electrically connected to a first base electrode of said unijunction transistor for discharging said charge stored on said timing capacitor through said unijunction transistor to said base electrode of said control transistor for providing a very rapid high current pulse to said base electrode of said control transistor and for providing conduction thereof and wherein a collector electrode of said control transistor being connected to said base electrode of said switching transistor of the switching means for controlling the conduction of said switching transistor and for initiating said nonconduction-time mode of the switching means to limit the maximum power output, said conduction of said switching transistor being inverse to said conduction of said control transistor and said time constant of said timing capacitor controlling the maximum duration of conduction of said control transistor by controlling the time for the accumulation of said charge stored on said timing capacitor, said unijunction transistor being conductive until said first voltage applied to said emitter electrode of said unijunction transistor falls below said threshold biasing voltage and said control transistor being conductive until reset by said switching transistor of the switching means, said unijunction transistor and said control transistor for rapidly disabling said switching transistor of the switching means.

5. The switching power supply of claim 4 wherein the rectified and filtered alternating current voltage applied across said primary winding is applied to the switching means wherein said switching transistor being conductive provides a path for said current flow through said primary winding for providing said field of energy stored in said core and wherein said switching transistor being nonconductive permits said open circuit voltage to develop across said primary winding greater in magnitude than the magnitude of said rectified and filtered alternating current voltage applied to said primary winding for providing conduction of said rectifier in the output circuit of said second of said plurality of secondary windings and for providing a pulse of said direct current output voltage, the width of said pulse being directly dependent upon a time interval during which said switching transistor is nonconductive and upon the magnitude of said field of energy stored in said core, said magnitude of said field of energy being dependent upon the rectified and filtered alternating current voltage and the relationship between an inductance of said primary winding and said current flow through said primary winding and a time interval that said current in said primary winding flows;

an optical coupler transistor including an emitter electrode electrically connected to said timing capacitor and optically connected to a light-emitting diode connected to said second of said plurality of secondary windings for providing the control circuit means with a load sensing signal optically transmitted to said optical coupler transistor, said optical coupler transistor conducting said load sensing signal at a rate inversely dependent on the flow of said current through said primary winding and said switching transistor, and wherein said secondary current flowing in said second of said plurality of secondary windings being small provides a large load sensing signal and a high magnitude of conduction by said optical coupler transistor for rapidly charging said timing capacitor to said threshold biasing voltage of said unijunction transistor for providing conduction of said control transistor and the nonconduction of said switching transistor and wherein said secondary current increasing in magnitude provides a lower magnitude of conduction by said optical coupler transistor for providing a slower rate for charging said timing capacitor to said threshold biasing voltage for increasing the period of said conduction-time mode of the switching means and wherein said secondary current being a maximum magnitude provides a zero magnitude of conduction by said optical coupler transistor and wherein the charging of said timing capacitor being exclusively accomplished by a current flow through each of said plurality of variable resistors, said plurality of variable resistors and said timing capacitor forming an auxiliary resistive-capacitive network for adjusting the period of said conduction-time mode of the switching means, said timing capacitor storing said charge during said conduction-time mode and cyclically initiating said nonconduction-time mode of the switching means for permitting the rectified and filtered alternating current voltage applied to the switching means to decrease after said transfer of energy stored in said core.

6. The switching power supply of claim 5 wherein the measuring means further includes two zener diodes connected between said primary winding of the transformer and a feedback summing junction connected to said timing capacitor and responsive to variations in the rectified and filtered alternating current voltage applied across said primary winding for reducing an error signal at said feedback summing junction and for providing an improved line voltage regulation with a low loop gain around the control circuit means for avoiding instability and slow response time and wherein a compensation current flow through said zener diodes being directly related to the magnitude of the rectified and filtered alternating current voltage exceeding a preselected magnitude of the rectified and filtered alternating current voltage with said compensation current flow being larger for said magnitude of the rectified and filtered alternating current voltage having a large excess compared with said preselected magnitude of the rectified and filtered alternating current voltage, said larger compensation current flow providing a shorter time interval for charging said timing capacitor to said threshold biasing voltage of said unijunction transistor and for providing a longer time interval of conduction for said control transistor and a shorter time interval for said conduction-time mode of the switching means during each said plurality of conversion cycles dependent upon the amount by which the magnitude of the rectified and filtered alternating current voltage exceeds said preselected magnitude of the rectified and filtered alternating current voltage for maintaining a constant pulse magnitude of said primary current during each of said plurality of conversion cycles, and wherein a potential drop across said zener diodes being selected to equal the magnitude of the rectified and filtered alternating current voltage at said lowest line voltage operating point at which full power is desired, said compensation current flow through said zener diodes and said second of said plurality of variable resistors being zero when said potential drop across said zener diodes equals the rectified and filtered alternating current voltage applied across said primary winding for providing a maximum pulse width of said primary current in said primary winding, said primary current pulse width being held constant when said magnitude of the rectified and filtered alternating current voltage exceeds said preselected magnitude of the rectified and filtered alternating current voltage for maintaining the power output in the output circuit within a prescribed maximum magnitude.

7. The switching power supply of claim 6 wherein a time interval for the connection of sid rectified and filtered alternating current voltage to said primary winding between said lowest line voltage operating point and said highest line voltage operating point at which full power is desired is inversely dependent upon the magnitude of the rectified and filtered alternating current voltage applied across said primary winding, the product of said primary current and the rectified and filtered alternating current voltage applied across said primary winding being constant for controlling the magnitude of said field of energy stored in said core and transferred to the output circuit.

8. A switching power supply for controlling the maximum output power comprising in combination:
a transformer having a core, a primary winding, at least a single secondary winding and a drive winding, said drive winding being one hundred and eighty electrical degrees out of phase with said primary winding, said single secondary winding being in phase with said primary winding and further including a rectified and filtered alternating current voltage means for providing a rectified and filtered alternating current voltage applied to said primary winding for causing a current to flow through said primary winding, said primary windinag current increasing with time and dependent upon the magnitude of said rectified and filtered alternating current voltage divided by the magnitude of an inductance of said primary winding, said primary winding current creating a magnetic field for providing a field of energy to be stored in said core, the magnitude of said magnetic field being dependent upon one-half of said inductance of said primary winding multiplied by the square of said primary winding current and the magnitude of said field of energy stored in said core increasing in proportion to said magnitude of said rectified and filtered alternating current voltage over a fixed time interval;
switching means connected to said primary winding and said drive winding for providing a path with said primary winding through which said primary winding current flows and for interrupting said path with said primary winding to cause magnetic induction across said single secondary winding for providing a secondary current to flow in said single secondary winding to permit a transfer of said field of energy stored in said core;
input signal means for applying an input signal to the switching means for defining a conducting state and a nonconducting state wherein said conducting state comprises a conduction-time mode of the switching means during an interval of time during which the switching means conducts said primary winding current and stores said field of energy in said core and said nonconducting state comprises a nonconduction-time mode of the switching means during an interval of time during which the switching means blocks said primary winding current and transfers said field of energy stored in said core with the storage and transfer of said field of energy of the switching power supply being controlled by said conduction-time mode of the switching means and said conduction-time mode being controlled by the magnitude of the rectified and filtered alternating current voltage applied across said primary windings, the duration of said conduction-time mode being decreased as said rectified and filtered alternating current voltage is increased for maintaining a constant value of said field of energy stored in said core resulting in a maximum power output having a fixed magnitude for any magnitude of said rectified and filtered alternating current voltage applied across said primary winding and wherein the summation of said conduction-time mode and nonconduction time mode being equivalent to a conversion cycle and wherein said nonconduction time mode existing only for a time required to exhaust said field of energy stored in said core, the frequency of said conversion cycle being uncontrolled;
an output circuit including a rectifier connected to said single secondary winding for providing a secondary winding output voltage and said secondary current during said nonconductive-time mode of the switching means when said secondary winding output voltage biases said rectifier to conduct permitting said transfer of all of said field of energy stored in said core to said output circuit prior to the nonconduction of said rectifier accompanied by the return of said conduction-time mode of the switching means for reducing power losses in said rectifier; and
control circuit means connected to receive the rectified and filtered alternating current voltage applied across said primary winding and the switching means for exclusively initiating said nonconduction-time mode and including a control circuit resistive-capacitive network comprised of a timing capacitor and a plurality of variable resistors, said timing capacitor connected to electrical ground through a fixed resistor and having a charge stored at a rate directly related to the magnitude of said rectified and filtered alternating current voltage applied across said primary winding, said plurality of variable resistors including two variable resistors electrically connected to said timing capacitor for regulating the time constant for storing said charge on said timing capacitor for limiting the duration of said conduction-time mode of the switching means within a range of line voltage operating points at which full power is desired to be constant and independent of the magnitude of the rectified and filtered alternating current voltage applied across said primary winding, a first of said plurality of variable resistors being set at a magnitude for providing a lowest line voltage operating point and a second of said plurality of variable resistors being set at a magnitude for providing a highest line voltage operating point, said plurality of variable resistors being adjusted to regulate the maximum power output of the switching power supply over said range of line voltage operating points, and wherein the control circuit means is further connected to and cooperates with a measuring means for measuring said rectified and filtered alternating current voltage applied across said primary winding wherein said rectified and filtered alternating current voltage being smaller when compared with a prescribed voltage value provides a longer time interval for said rectified and filtered alternating current voltage to be connected across said primary winding for reaching a larger final current value and for providing a larger transfer of said field of energy in said secondary winding output voltage in the output circuit and wherein said rectified and filtered alternating current voltage being larger when compared with said prescribed voltage value provides a shorter time interval for said rectified and filtered alternating current voltage to be connected across said primary winding for reaching a smaller final current value and for providing a smaller transfer of said field of energy in said secondary winding output voltage in the output circuit, said measuring means including two Zener diodes connected between said primary winding of the transformer and a feedback summing junction connected to said timing capacitor and responsive to variations in the rectified and filtered alternating current voltage applied across said primary winding for reducing an error signal at said feedback summing function and for providing an improved line voltage regulation and wherein said measuring means facilitating the control of the duration of said conduction-time mode of the switching means and said range of line voltage operating points by the control circuit means, and wherein said secondary current through said rectifier is a zero value prior to said nonconduction of said rectifier after said transfer of all of said field of energy stored in said core and wherein said primary current has a zero value at the initiation of said conduction-time mode for providing voltage regulation limiting the maximum output power to a capacity electrical load and wherein said drive winding is wound about the transformer core and electrically connected to the switching means, the switching means including a switching transistor for controlling the duration for which said rectified and filtered alternating current voltage is applied across said primary winding, said drive winding having a first end electrically connected to a base electrode of said switching transistor and a second end connected to electrical ground, and the switching power supply further includes a regenerating capacitor connected in series with a resistor, said regenerating capacitor and said resistor being connected in a parallel configuration with the primary winding, said regenerating capacitor storing an electrical charge during said conduction time mode and discharging through the primary winding said electrical charge after said transfer of all of said field of energy stored in said core during said nonconduction time mode providing an open circuit voltage across said primary winding greater in magnitude than the magnitude of said rectified and filtered alternating current voltage and wherein a positive half cycle of an alternating current voltage is induced into said drive winding for each of a plurality of said conversion cycles for exclusively cycling the switching means from said nonconduction-time mode to said conduction-time mode by applying said alternating current voltage to said base electrode of said switching transistor for causing said switching transistor to conduct and for causing the control circuit means to be reset to an initial nonconductive state.

* * * * *